D. L. DEFIBAUGH.
Wagon-Brake.

No. 164,153.  Patented June 8, 1875.

WITNESSES:  INVENTOR:

UNITED STATES PATENT OFFICE.

DANIEL L. DEFIBAUGH, OF BEDFORD, PENNSYLVANIA.

IMPROVEMENT IN WAGON-BRAKES.

Specification forming part of Letters Patent No. 164,153, dated June 8, 1875; application filed March 29, 1875.

*To all whom it may concern:*

Figure 1:
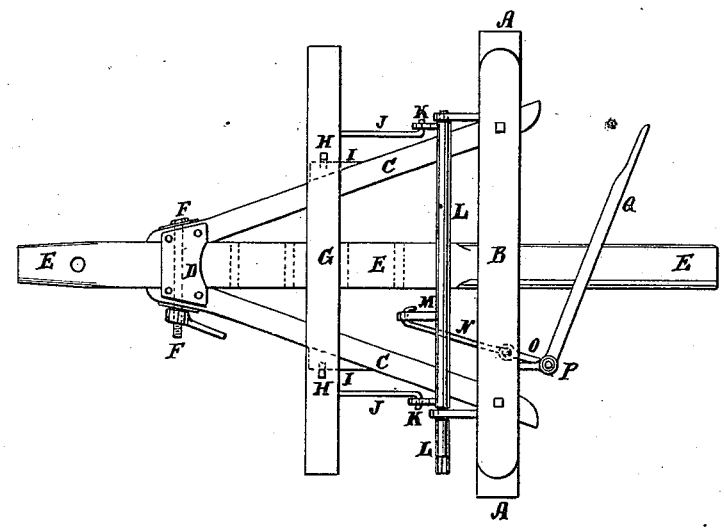
Figure 2:
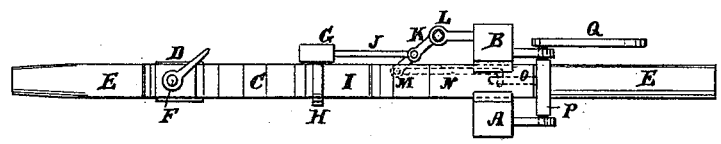

Be it known that I, DANIEL L. DEFIBAUGH, of Bedford, in the county of Bedford and State of Pennsylvania, have invented a new and useful Improvement in Wagons, of which the following is a specification:

Figure 1 is a top view of a portion of a wagon-gearing illustrating my invention. Fig. 2 is a side view of the same.

Similar letters of reference indicate corresponding parts.

The invention will first be fully described, and then pointed out in the claim.

A is the rear axle, and B is the rear bolster, of a wagon-gearing. C are the rear hounds, the rear ends of which are secured to and between the axle A and bolster B. The forward ends of the hounds C nearly meet, space being left between them to receive the reach, and are connected with each other by a plate, D, securely bolted to the upper side of said ends.

E is the reach, which passes through the space between the forward ends of the hounds C, and is secured in place by a bolt, F, passed horizontally through the said ends of the hounds C, and through the said reach E, and is secured in place by a hand-nut screwed upon its end. Several holes are formed through the reach E to receive the bolt F, so that the wagon-gearing can be readily adjusted to any desired length. This construction makes the wagon much stronger than the old construction, as it allows the hounds to be made of straight timber. G is the brake-bar, which rests upon the hounds C, and is kept in place by the hook-bolts H, which hook upon the lower side of triangular blocks I, attached to the outer sides of the said hounds C. To the rear side of the end parts of the brake-bar G are attached the forward ends of two rods, J, the rear ends of which are pivoted to the ends of two crank-arms, K, rigidly attached to the rod or shaft L, that works in bearings attached to the rear bolster B. One end of the rod L is squared off to receive the lever by which the brake is applied from the wagon-body, which lever is not shown in the drawings. To the rod L is rigidly attached a longer crank-arm, M, to the end of which is pivoted the end of the connecting-rod N. The rear end of the connecting-rod N is pivoted to an arm, O, rigidly attached to the short vertical shaft P that works in bearings attached to the rear side of the axle A and bolster B, and to which is rigidly attached the end of the lever Q, that projects horizontally in the rear of the axle A and bolster B. This construction enables the brake to be applied, when the wagon is loaded with grain or hay, or other loading that prevents the ordinary brake-lever from being operated, by a man or boy in the rear of the loaded wagon, in which position he cannot be run over and injured, should he happen to fall.

Having thus described my invention, I claim as new and desire to secure by Letters Patent—

The combination of the hook-bolts H and triangular blocks I with the brake-bar G and the hounds C, substantially as set forth.

DANIEL L. DEFIBAUGH.

Witnesses:
A. J. SANSOM,
SAMUEL AKE.